J. D. WALLACE.
SPRAYING MACHINE.
APPLICATION FILED FEB. 13, 1909.
978,082.
Patented Dec. 6, 1910.
3 SHEETS—SHEET 1.
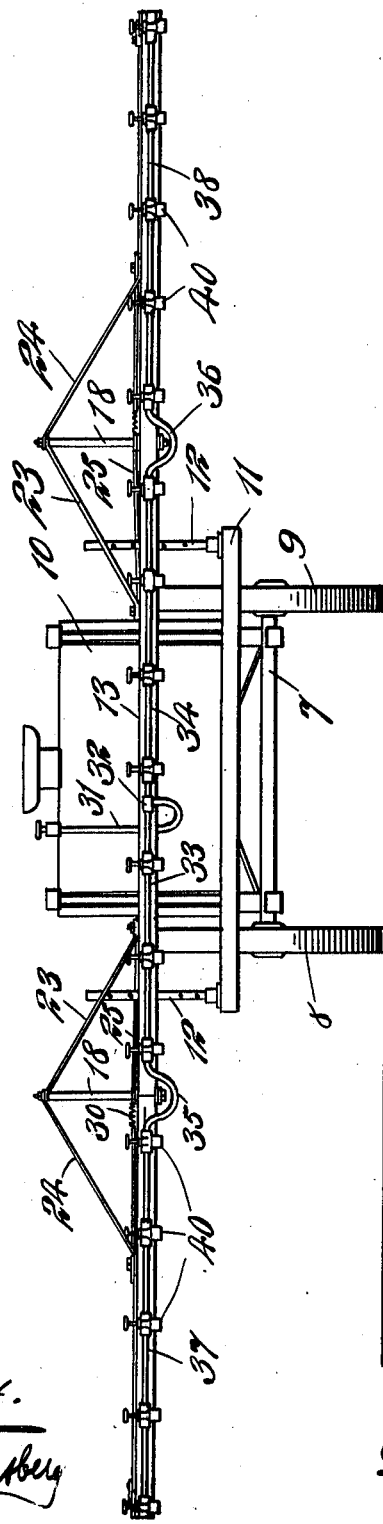

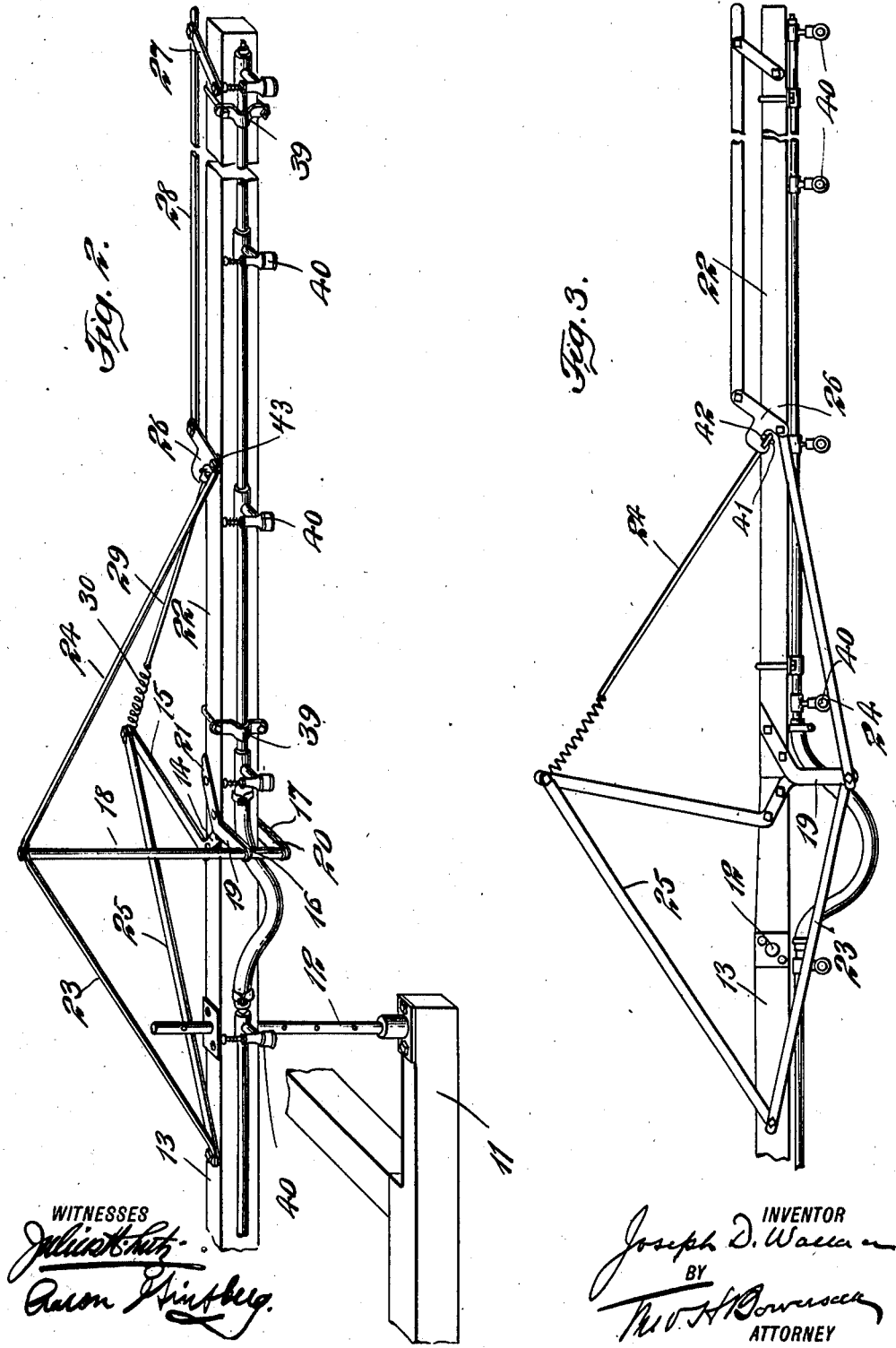

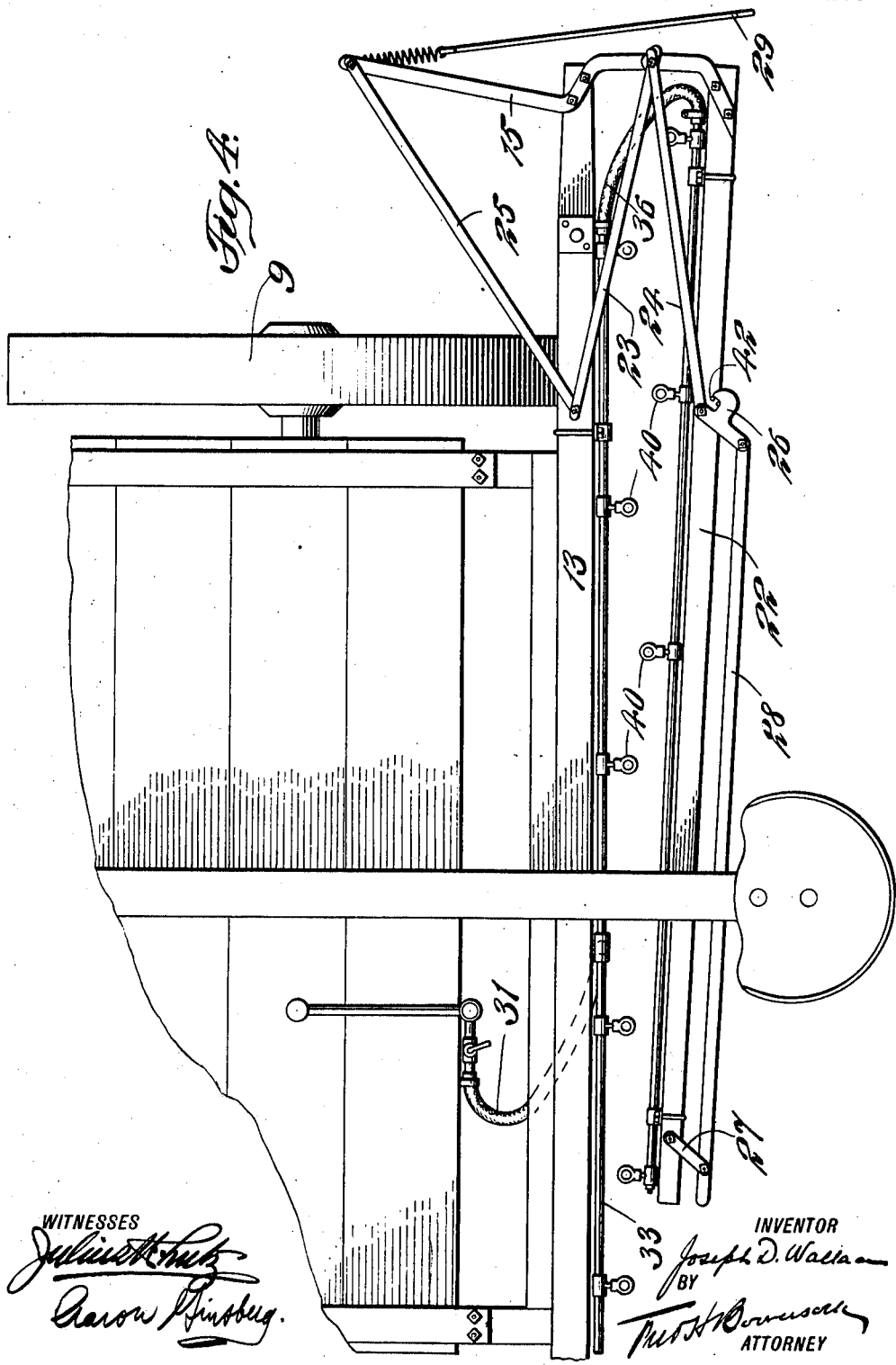

UNITED STATES PATENT OFFICE.

JOSEPH D. WALLACE, OF CHAMPAIGN, ILLINOIS.

SPRAYING-MACHINE.

978,082.  Specification of Letters Patent.  Patented Dec. 6, 1910.

Application filed February 13, 1909. Serial No. 477,654.

*To all whom it may concern:*

Be it known that I, JOSEPH D. WALLACE, a citizen of the United States, and a resident of the city and county of Champaign and State of Illinois, have invented certain new and useful Improvements in Spraying-Machines, of which the following is a specification.

This invention relates to portable spraying machines, such as are employed for the purpose of properly distributing a fertilizer or an insecticide, or other liquid compound for other purposes, over lawns, fields, gardens, parks, boulevards and the like. Such machines are usually suitably mounted upon wheels and are generally adapted to be drawn by horses. Apart from delivering the liquid in the form of a spray which is properly distributed, it is desirable to cover as much ground as possible at each operation, wherefore it is desirable to employ in connection with the portable frame, the storage tank or reservoir and the force pump, a pair of arms projecting laterally from the machine and supporting delivery pipes from the pump, said delivery pipes being provided with a plurality of spraying nozzles whereby the path covered by the spraying devices will be of the greatest possible area.

It will be apparent that where long projecting arms are employed, if the same are rigid, two difficulties are encountered; first, that of drawing the device into any suitable inclosure or through any ordinary door or opening for the purposes of storage, on account of the excessive distance between the ends of the two arms, and, second, that in distributing the desired compound over a field or through an orchard, obstacles are likely to be encountered, such as, a tree, stump, post, the edge of the building or an animal, in which case, if these arms were rigid, one or the other thereof would very likely be broken, and under any circumstances great care would have to be exercised and much time lost in order to get around any obstruction of a permanent character and still treat the ground or the plants in the immediate vicinity thereof.

The object of the present invention is the provision of a portable spraying machine equipped as suggested with long arms, and therefore covering a very wide path in transit, said arms being provided with means whereby, first, they may be folded back against the machine, when not in use, and thus bring the extreme dimensions of the machine within ordinary compass, and, second, while normally held in their extended or projected position, will, independently swing or fold rearwardly when an obstruction of any character is encountered. Incidental to the above, I have in view a portable spraying machine which is simple in construction, dependable in operation, comparatively cheap in cost, and which will cover the largest possible area in its operation.

My invention will be more readily understood by reference to the accompanying drawings, forming part of this specification, in which, Figure 1 is a rear elevation of a machine embodying my invention with the arms thereof extended; Fig. 2 is an enlarged perspective view, partly broken away, of one of the arms, in its extended position, showing the preferred manner of attaching the rigid portion thereof to the frame of the machine; Fig. 3 is a top plan view of the arm shown in Fig. 1, and Fig. 4 is an enlarged top plan view of the rear portion of the body of the machine, showing one of the arms folded back against the rear of the machine.

As suggested, I prefer to mount the device upon a suitable frame 7 which is preferably mounted upon four wheels, of which the rear wheels 8 and 9 are shown in Fig. 1. Upon this frame is mounted the storage or supply tank 10 for the liquid employed, below which (not shown in the drawings inasmuch as it forms no part of the present invention) is located the pumping mechanism, which is generally driven from the rear axle or from one of the rotating wheels.

Suitably carried by the frame of the machine, at the rear thereof, is the fixed horizontal supporting bar 11 carrying a vertical post 12 at each end thereof. Upon these posts is mounted the fixed or rigid middle portion 13 of the supporting arms, this rigid portion 13 being subject to vertical adjustment upon such posts 12 in any suitable manner.

Suitably fastened to each end of the rigid middle portion 13 of the supporting arms, is a pair of plates the upper 14 of which is laterally extended in both directions to provide the longer arm 15 on one side thereof and the shorter arm 16 on the other side thereof. The other plate, similarly secured, is provided with an extension forming the laterally projecting arm 17 which corresponds to the arm 16. In these arms 16 and 17 is mounted the elongated hinge-pin 18, to which are secured the arms or brackets 19 and 20, projecting from the plate 21 and its opposite counterpart, respectively, secured to the end of the arm 22. It will be apparent that this construction permits of the swinging of the arm 22 in a horizontal plane about the pivot provided by the hinge-pin 18. The length of each of these arms 22 renders it necessary that they be vertically supported, the hinge connection with the beam 13 not being sufficient for this purpose. For this reason, I prefer to elongate the hinge-pin 18 to form a post to the top of which are secured the tie-rods 23 and 24, the former secured to the beam 13 and the latter to the swinging arm 22 and supporting said arm. The tie rod 24 has pivotal connection with the post 18, and having a common center will swing with said arm 22 when the latter is moved in a horizontal direction.

The arm 22 is normally retained in its extended position by means of a device which comprises the arm or bracket 15 and the brace or tie-rod 25 secured to the beam 13 and the end of said arm 15. Pivoted to the arm 22 at 43, is the hook-link 26, which corresponds to the link 27 correspondingly pivoted near the end of the arm 22. To the other end of these links is pivoted the bar 28, and these links are so disposed with relation to the arm 22 that pressure against the bar 28 in the direction of said arm will cause said links to turn upon their pivots as said bar 28 is forced toward the arm 22. In the hook with which the link 26 is provided, is inserted the hooked end of the rod 29, the other end of which is secured to the end of the arm 15 through the interposition of a tension spring 30. This adjustment is such that when the bar 28 is forced toward the arm 22, the hook in the link 26 will be withdrawn from the hook in the end of the rod 29, and the arm 22 will therefore be free to swing in a horizontal plane. The tension of the spring 30 is sufficient to normally retain said arm 22 in its extended position, the function of this spring being primarily to allow for a time element during the short period that the bar 28 is operating to unhook the rod 29.

From the reservoir or supply tank 10 leads a suitable pipe 31 communicating through the coupling 32 with branches 33 and 34 mounted upon the beam 13. Near the ends of said beam 13, these branches terminate in hose, 35 and 36, respectively, or other flexible tubing, which form flexible connections with the extensions 37 and 38 of said branches, respectively, supported upon the swinging arms. I prefer that the pipe should be secured to the arm by means of suitable clamps 39, and at regular intervals, along the whole length of pipe, are provided a series of spraying devices 40 which may be of any desired form and character.

It will now be apparent that arms of comparatively great length may be employed, thus enabling me through the employment of my device to cover a very wide path with a single trip of the machine. It will furthermore be apparent that if an obstruction is encountered which would normally tend to break or distort either of the two extended arms, such obstruction will first impinge against the bar 28, forcing the same toward the arm 22 and through the links operating to unhook the tie rod 29 and permit said arm to swing on its hinge and thus clear the obstruction. Furthermore, it will be apparent that through the offsetting of the hinge-pin 18 from the vertical plane of the arms, the latter may swing through an arc of approximately 180° and thus fold back against the rear of the machine, as shown in Fig. 4.

As a means of insuring unhooking or unclasping action when the bar 28 is moved toward the arm 22, I prefer to employ a pair of guide-pins or stops 41 and 42 in the top face of the arm 22 and so located as to permit the end of the rod 24 to pass freely therebetween. The stop or pin 42 prevents movement of said rod 24 with the hook on the link 26, as the latter is being withdrawn from the hook in said rod 24, while the stop or pin 41 prevents accidental unhooking or unclasping due to jarring of the machine. Furthermore, the pin 42 acts as a stop to prevent movement of the link 26 to the left (Fig. 3) beyond its normal point as shown in the drawings.

Many modifications of minor details of my improved spraying machine will doubtless readily suggest themselves to those skilled in the art to which it appertains and I therefore do not desire to limit my invention to the specific construction herein shown and described.

I claim as new and desire to secure by Letters Patent:

1. In a device of the character described, the combination, with a portable frame, of a rearwardly swinging arm normally projecting laterally from said frame, means for locking said arm in its extended position, and means for releasing said locking means through the initial pressure of an obstruction in the path of movement of said arm.

2. In a device of the character described, the combination, with a portable frame, of a rearwardly-swinging arm normally projecting laterally from said frame, means for supporting said arm in a horizontal plane in all positions thereof, means normally retaining said arm in its extended position, and means for releasing said retaining means through the initial pressure of an obstruction in the path of movement of said arm.

3. In a device of the character described, the combination, with a portable frame, of a laterally-projecting rearwardly-swinging arm on each side of said frame, means for supporting each of said arms in a horizontal plane in all positions thereof, means normally retaining said arm in its extended position, and means non-interferent with said supporting means for releasing said retaining means through the initial pressure of an obstruction in the path of movement of said arm.

4. In a spraying machine, the combination, with a portable frame carrying a source of liquid supply and having a branched delivery pipe, of a laterally-projecting swinging arm on each side of said frame, each arm carrying a branch of said delivery pipe and said branches being provided with suitable spraying nozzles, means normally retaining each of said arms in its extended position, and means for releasing said retaining means through initial pressure of an obstruction in the path of movement of said arm, each of said branch pipes including a flexible portion to permit of the swinging of said branch pipe with its supporting arm.

5. In a spraying machine, the combination, with a portable frame carrying a source of liquid supply and having a branched delivery pipe, of a laterally projecting swinging arm on each side of said frame, each arm carrying a branch of said delivery pipe and said branches being provided with suitable spraying nozzles, means normally locking each of said arms in its extended position, means for releasing said locking means through initial pressure of an obstruction in the path of movement of said arm, each of said branch pipes including a flexible portion to permit of said branch pipe swinging with its supporting arm, and means for supporting said arm in a horizontal plane in all positions thereof.

6. In a device of the character described, the combination, with a portable frame, of a swinging arm projecting laterally from said frame, a rod normally retaining said arm in its extended position, a bar yieldingly carried on the forward side of said arm, and connecting means between said rod and said bar to release said rod upon initial pressure against said bar.

7. In a device of the character described, the combination, with a portable frame, of a swinging arm projecting laterally from said frame, means normally locking said arm in its extended position, and a releasing device for said locking means carried by said arm on the forward side thereof and adapted to contact with an obstruction in the path of movement of said arm.

8. In a device of the character described, the combination, with a portable frame, of a supply reservoir adapted to contain liquid under pressure, a delivery pipe from said reservoir projecting laterally from said frame, the projecting portion of said pipe being foldable horizontally toward said frame, means for supporting said pipe in its extended and folded positions, and means releasable through initial pressure of an obstruction in the path of movement of said supporting means for locking said pipe in its extended position.

9. In a device of the character described, the combination, with a portable frame, of a supply reservoir adapted to contain liquid under pressure, a delivery pipe from said reservoir projecting laterally to each side of the frame, the projecting portions of said pipe being foldable horizontally toward said frame, means for supporting each projecting portion of said pipe in its extended and folded positions, and means releasable through initial pressure of an obstruction in the path of movement of said supporting means for locking each projecting portion of said pipe in its extended position.

In testimony of the foregoing, I have hereunto set my hand in the presence of two witnesses.

JOSEPH D. WALLACE.

Witnesses:
 BERTHA W. TIFFANY,
 W. M. TIFFANY.